(12) United States Patent
Niino et al.

(10) Patent No.: US 8,380,415 B2
(45) Date of Patent: Feb. 19, 2013

(54) BRAKE CONTROL APPARATUS AND MOTOR ROTATIONAL SPEED COMPUTATION METHOD USED IN SAID BRAKE CONTROL APPARATUS

(75) Inventors: Hiroaki Niino, Toyota (JP); Tetsuya Yoshijima, Kariya (JP); Masato Kimbara, Kariya (JP); Yoshio Masuda, Kariya (JP)

(73) Assignee: Advics Co., Ltd., Aichi (JP)

( * ) Notice: Subject to any disclaimer, the term of this patent is extended or adjusted under 35 U.S.C. 154(b) by 332 days.

(21) Appl. No.: 12/891,416

(22) Filed: Sep. 27, 2010

(65) Prior Publication Data
US 2011/0077832 A1 Mar. 31, 2011

(30) Foreign Application Priority Data

Sep. 28, 2009 (JP) ................................ 2009-223174
Dec. 8, 2009 (JP) ................................ 2009-278731

(51) Int. Cl.
*G06F 19/00* (2006.01)
(52) U.S. Cl. .......................................... 701/78; 701/70
(58) Field of Classification Search ............... 701/70–83; 303/113.1–114.1
See application file for complete search history.

(56) References Cited

U.S. PATENT DOCUMENTS

| 6,164,402 A | 12/2000 | Hastreiter |
| 2009/0072615 A1* | 3/2009 | Oosawa et al. ............. 303/113.1 |
| 2009/0189440 A1* | 7/2009 | Abe et al. ................... 303/114.1 |
| 2010/0117445 A1* | 5/2010 | Kato et al. ....................... 303/11 |

FOREIGN PATENT DOCUMENTS

| JP | 2000-158977 A | 6/2000 |
| JP | 2001-71755 A | 3/2001 |

* cited by examiner

*Primary Examiner* — Richard M. Camby
(74) *Attorney, Agent, or Firm* — Sughrue Mion, PLLC

(57) ABSTRACT

There is provided a low-cost, power-saving brake control apparatus that is capable of performing control with good pressure regulation precision. The brake control apparatus has adjusting motor rotational speed computation means for causing pressurization control means to set a pressure regulation valve in a closed state and carry out an action of driving a pump at a predetermined motor rotational speed a plurality of times at different motor rotational speeds, and for computing in advance a adjusting motor rotational speed on the basis of the ratio between each of the motor rotational speeds and each of the pressure gradients for when the pressurization force of a pump driven at each of the motor rotational speeds has reached a predetermined pressure; and requested motor rotational speed correction means for correcting the requested motor rotational speed on the basis of the adjusting motor rotational speed in a case where the pressurization control means increases the pressure of the wheel cylinders and generates braking force in the wheels.

13 Claims, 8 Drawing Sheets

BRAKE CONTROL APPARATUS AND MOTOR ROTATIONAL SPEED COMPUTATION METHOD USED IN SAID BRAKE CONTROL APPARATUS

BACKGROUND OF THE INVENTION

1. Field of the Invention

The present invention relates to a brake control apparatus provided with pressurization control means for driving a pump at a requested motor rotational speed that is based on a predetermined pressurization force to feed brake fluid to a wheel cylinder in the case that the pressurization force is imparted to a wheel cylinder disposed in each wheel of a vehicle to generate braking force; and for regulating the pressurization force by controlling the position of a pressure regulation valve disposed in a circulation channel for circulating a portion of the fed brake fluid. The present invention also relates to a motor rotational speed computation method used in such a brake control apparatus.

2. Description of the Related Art

In a conventional brake control apparatus, a master cylinder pressure is generated by a master cylinder on the basis of brake operational force, and brake fluid is fed to the wheel cylinder provided to each wheel on the basis of the master cylinder pressure to control the braking force of the vehicle. Disposed between the master cylinder and the wheel cylinder in such a brake control apparatus are a pump driven by a motor to further pressurize brake fluid that is at the master cylinder pressure, a circulation channel for circulating a portion of the brake fluid discharged from the pump, and a pressure regulation valve disposed in the circulation channel to regulate the pressure difference (differential pressure) between the upstream side and the downstream side of the pump. A brake control apparatus having such a configuration controls the pressure (wheel cylinder pressure) of brake fluid fed to the wheel cylinder by circulating a portion of the brake fluid discharged from the pump back to the pump without feeding it to the wheel cylinder to regulate the differential pressure (e.g., Patent Document 1).

In this configuration, the pump described above has a problem in terms of its configuration in that the outputted pressure leaks ("pump leakage") when the wheel cylinder pressure is varied. Patent Document 2 listed below provides a technique for improving such a problem.

The vehicle propulsion apparatus described in Patent Document 2 is provided with a flow rate meter for measuring the flow rate discharged from the pump. The measured flow rate and the flow rate discharged from the pump obtained by computation are compared to compute the amount of leakage, and control is carried out so as to compensate for the amount of leakage.

[Patent Document 1] JP (Kokai) 2001-71755
[Patent Document 2] JP (Kokai) 2000-158977

SUMMARY OF THE INVENTION

In the technique described in Patent Document 1, the motor is caused to rotate at a constant speed in relation to the wheel cylinder pressure to drive the pump. Accordingly, the percentage of the amount of pump leakage in relation to the motor rotational speed does not vary, and the amount of brake fluid that circulates through the pump is unambiguously fixed and does not vary in relation to the wheel cylinder pressure. However, the precision for regulating the wheel cylinder pressure is worsened because the percentage of the amount of pump leakage in relation to the motor rotational speed varies when the rotational speed of the motor varies in relation to the wheel cylinder pressure, and the amount of brake fluid that circulates through the pump is not unambiguously fixed, but rather varies in relation to the wheel cylinder pressure.

In accordance with the vehicle propulsion apparatus of Patent Document 2, the amount of pump leakage can be compensated for. However, this results in higher cost because a flow meter must be provided. There is also a need to provide an arrangement location for the flow meter as well as any jigs, wiring, and the like that accompany a flow meter. Also, the flow meter as well as any jigs, wiring, and the like that accompany a flow meter are disadvantageous in terms of making a vehicle more lightweight.

Furthermore, in accordance with the general techniques of this type, the motor for driving the pump is operated at a predetermined constant rotation that is modified in correspondence with the wheel cylinder pressure, and the pressure regulation between the downstream side and the upstream side of the pump is controlled by opening and closing the pressure regulation valve. In the case that the motor is operated at a constant rotation to control the brake force using a pressure regulation valve, power is wastefully consumed because the motor is not changed to low rotation, but is rather operated at a constant rotation even when the required brake force is low.

In view of the above-described problems, an object of the present invention is to provide a low-cost, power-saving brake control apparatus that can perform control with good pressure regulation precision, and to provide a low-cost, power-saving motor rotational speed computation method having good pressure regulation precision.

An aspect of the brake control apparatus according to the present invention for achieving the above-stated objects is a brake control apparatus provided with pressurization control means whereby, in a case where a pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated; the brake control apparatus comprising: characteristics storage means for storing in advance a temporal change of the wheel cylinder pressure in a case that the pressure regulation valve has been set in a closed state and the pump has been driven at an unambiguous motor rotational speed in relation to the wheel cylinder pressure; and adjusting motor rotational speed computation means for computing, in relation to a target pressurization gradient of the pressurization force imparted to the wheel cylinder, a adjusting motor rotational speed for yielding the target pressurization gradient on the basis of the temporal change of the stored wheel cylinder pressure.

With such a characteristic configuration, the rotational speed of the motor is not merely reduced in order to contribute to improvement in power saving, but the adjusting motor rotational speed for correcting the requested motor rotational speed is also computed on the basis of the temporal change of the wheel cylinder pressure in which consideration has been given to pump leakage stored in advance. Therefore, control can be performed with good regulation precision. Also, since the adjusting motor rotational speed for implementing the target pressurization gradient is computed based on the temporal change of the wheel cylinder pressure, there is no need to provide a flow rate sensor or the like for measuring the flow rate of the brake fluid, for example. Therefore, it is possible to achieve a low-cost brake control apparatus having good pressure regulation precision.

The adjusting motor rotational speed computation means preferably acquires the pressure gradient that corresponds to the wheel cylinder pressure at the point in the temporal change of the wheel cylinder pressure at which the pressurization force is imparted and brake force is generated, and computes the adjusting motor rotational speed on the basis of the acquired pressure gradient and the differential pressure between and the acquired pressure gradient and the target pressurization gradient.

With such a configuration, the target motor rotational speed, in which consideration has been given to a pump flow that allows a target pressurization gradient to be achieved, can be computed based on the motor rotational speed when the temporal change of the wheel cylinder pressure stored in advance has been acquired, and on the adjusting motor rotational speed, which is computed according to the difference between the pressure gradient at the time that the brake was operated and the target pressurization gradient. Pressure can be regulated with good precision because these are motor rotational speeds for which pump leakage has been taken into account.

Another aspect of the brake control apparatus according to the present invention for achieving the above-described objects is a brake control apparatus provided with pressurization control means whereby, in a case where a predetermined pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated, the brake control apparatus comprising: adjusting motor rotational speed computation means for causing the pressurization control means to set the pressure regulation valve in a closed state and carry out an action of driving the pump at a predetermined motor rotational speed a plurality of times at different motor rotational speeds, and for computing in advance a adjusting motor rotational speed on the basis of the ratio between each of the motor rotational speeds and each of the pressure gradients for when the pressurization force of a pump driven at each of the motor rotational speeds has reached a predetermined pressure; and requested motor rotational speed correction means for correcting the requested motor rotational speed on the basis of the adjusting motor rotational speed in a case where the pressurization control means increases the pressure of the wheel cylinders and generates braking force in the wheels.

With such a configuration, it is not merely that the rotational speed of the motor is reduced in order to contribute to improvement in power saving, but the motor can be controlled with consideration given to the adjusting motor rotational speed for correcting the requested motor rotational speed; therefore, control can be performed with good regulation precision. Also, the pressurization control means is caused to set the pressure regulation valve in a closed state and to carry out the action of driving the pump at a predetermined motor rotational speed a plurality of times at different motor rotational speeds, and the adjusting motor rotational speed is computed on the basis of the ratio between the rotational speed of each motor and each pressure gradient for when the pressurization force of the pump driven at each motor rotational speed has reached a predetermined pressure. Therefore, there is no need to provide, e.g., a flow rate sensor or the like for measuring the flow rate of the brake fluid. Accordingly, it is possible to achieve a low-cost brake control apparatus having good pressure regulation precision.

The requested motor rotational speed correction means preferably adds the requested motor rotational speed and the adjusting motor rotational speed to compute the target motor rotational speed.

In accordance with such a configuration, pump leakage can be suitably compensated for because the motor is brought to a rotational speed obtained by adding the adjusting motor rotational speed to the requested motor rotational speed computed, without consideration given to pump leakage from the pressure requested from the wheel cylinder. Therefore, it is possible to control braking force with good pressure regulation while saving power.

It is preferred that storage means for mapping and storing the relationship between the adjusting motor rotational speed and the pressure fed to the wheel cylinder be further provided.

In accordance with such a configuration, the adjusting motor rotational speed that corresponds to the pressure being fed to the wheel cylinder can be suitably read and the requested motor rotational speed can be amended.

It is preferred that the computation of the adjusting motor rotational speed be carried out every preset time of pump usage.

In accordance with such a configuration, the adjusting motor rotational speed can be updated in accordance with the pump usage time. Therefore, degradation over time can be suitable compensated.

It is preferred that the computation of the pressure gradient be carried out using the amount of change in pressure in a predetermined time set in advance.

In accordance with such a configuration, the pressure gradient can be readily computed.

The method for computing motor rotational speed used in the brake control apparatus according to the present invention for achieving the objects described above is a method used in a brake control apparatus provided with pressurization control means whereby, in a case where a predetermined pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated; the method comprising: causing the pressurization control means to set the pressure regulation valve in a closed state and carry out an action of driving the pump at a predetermined motor rotational speed a plurality of times at different motor rotational speeds, and for computing in advance a adjusting motor rotational speed on the basis of the ratio between each of the motor rotational speeds and each of the pressure gradients for when the pressurization force of a pump driven at each of the motor rotational speeds has reached a predetermined pressure; and computing the requested motor rotational speed on the basis of the adjusting motor rotational speed in a case where the pressurization control means increases the pressure of the wheel cylinders and generates braking force in the wheels.

In accordance with this aspect, the effects described above can be obtained in similar fashion to the brake control apparatus of the present invention described above, and the various additional aspects described above can be provided.

DESCRIPTION OF THE PREFERRED EMBODIMENTS

First Embodiment

Figure 1:
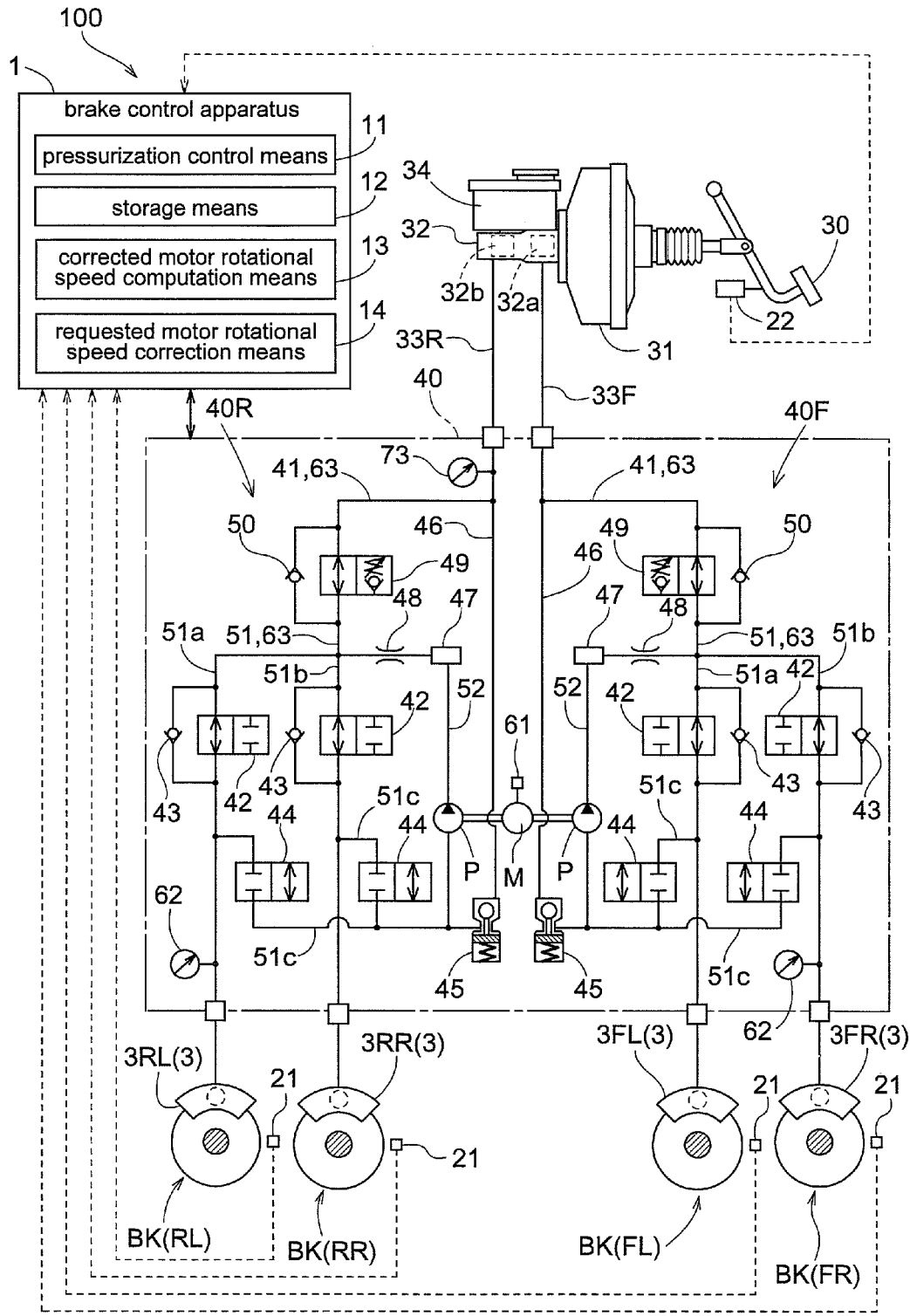
FIG. 1 is a block diagram schematically showing the overall configuration of the brake system according to a first embodiment.

Embodiments of the present invention are described below with reference to the drawings. FIG. 1 is a block diagram schematically showing a brake system 100 provided with the brake control apparatus of the present invention. The brake system 100 is provided with a braking system that increases the pedal operational force (pedal pressure) of a brake pedal 30 using a booster 31 to transmit the force to a tandem-type master cylinder 32, and transmits the pressure of brake fluid from the master cylinder 32 to the brake device BK via the brake control unit 40.

The master cylinder 32 has a structure that sends brake fluid pressurized via a channel 33F from one of the pressurization chambers 32a to the brake device BK provided to the front wheels in accordance with the pedal operation, and simultaneously sends brake fluid pressurized via a channel 33R from the other pressurization chamber 32b to the brake device BK provided to the rear wheels. The pressure of the brake fluid from the channels 33F, 33R is applied to the brake device BK via the brake control unit 40.

The booster 31 has a function for increasing the pedal force to actuate the master cylinder 32 by causing intake pressure of the engine (not shown) to act on an internal diaphragm (not shown) when the brake pedal 30 has been depressed and operated. The master cylinder 32 internally has two pistons (not shown) coaxially arranged in tandem, and causes pressure from the pressurization chambers 32a, 32b that correspond to the pistons, respectively, to act on the brake fluid. A reservoir tank 34 for replenishing brake fluid is provided to the master cylinder 32 in a position above the master cylinder 32.

The brake control unit 40 is provided with a fluid pressure control unit 40F for controlling and imparting the pressure of the brake fluid fed via the channel 33F to the brake device BK of the left front FL and the brake device BK of the right front FR, and a fluid pressure control unit 40R for controlling and imparting the pressure of the brake fluid fed via the channel 33R to the brake device BK of the left rear RL and the brake device BK of the right rear RR.

The fluid pressure control unit 40F that corresponds to the brake device BK of the left front FL and the brake device BK of the right front FR, and the fluid pressure control unit 40R that corresponds to the brake device BK of the left rear RL and the brake device BK of the right rear RR have substantially the same configuration and the same operating mode. Accordingly, the configuration and operating mode of the fluid pressure control unit 40F that corresponds to the to the brake device BK of the front left FL and the brake device BK of the front right FR will be described below.

The fluid pressure control unit 40F is provided with a normally-open-type pressure regulation valve 49 for causing fluid pressure from a main channel 41 in communication with the channel 33F to actuate the brake device BK of the left front FL and the right front FR. Also, a check valve 50 is provided in parallel with the above in order to relieve fluid pressure from the channel 33F to the brake device BK side in the case that the fluid pressure of the channel 33F has become greater than the pressure of the brake device BK.

The brake device BK side of the pressure regulation valve 49 is provided with a channel 51. The channel 51 has a first branching channel 51a and a second branching channel 51b. Normally-open-type inlet valves 42 are disposed between the first branching channel 51a and the second branching channel 51b, and a check valve 43 is provided in parallel with the above in order to relieve fluid pressure from the brake device BK toward the direction of the channel 51.

Branching channels 51c for branching from a location on the brake device BK side from the inlet valves 42 are formed in the first branching channel 51a and the second branching channel 51b, and normally-closed-type outlet valves 44 are disposed in the branching channels 51c.

The inlet valves 42 are composed of a solenoid-operated two-position switching valve that is open in an unenergized state and closed in an energized state. The outlet valves 44 are composed of a solenoid-operated two-position switching valve that is closed in an unenergized state and open in an energized state.

A reservoir 45 for temporarily storing brake fluid is provided to the merge portion of the branching channels 51c from two outlet valves 44, and also provided is a return channel 46 for returning brake fluid from the reservoir 45 to the main channel 41.

Also provided is a feed channel 52 in which are disposed a pump P driven by a motor M so as to draw brake fluid from the merge portion of the branching channels 51c to which brake fluid is sent out from the two outlet valves 44; a damper chamber 47 for reducing sound of brake fluid discharged from the pump P; and an orifice 48 for limiting the flow rate of brake fluid flowing through the channel 51.

A wheel speed sensor 21 for detecting the vehicle state and an amount-of-braking-operation detection sensor 22 are arranged in the vehicle. The wheel speed sensor 21 monitors the lock state of the wheel, detects the speed of the vehicle, and accordingly corresponds to vehicle speed acquisition means for acquiring the speed of the vehicle in which the wheel speed sensor is mounted. The wheel speed sensor 21 having such functions is disposed in each wheel provided to the vehicle, i.e., the left front, the right front, the left rear, and the right rear (hereinafter referred to as FL, FR, RL, RR, respectively). The amount-of-braking-operation detection sensor 22 corresponds to amount of braking operation detection means for measuring the amount of operation applied by the driver to the brake pedal 30. The detection results acquired from the wheel speed sensors 21 and the amount-of-braking-operation detection sensor 22 are transmitted to the brake control apparatus 1 as sensor outputs.

A wheel cylinder 3 is provided to each wheel provided to the vehicle, i.e., the left front FL, the right front FR, the left rear RL, and the right rear RR. In other words, a wheel cylinder 3 is provided to each wheel of the vehicle. The wheel cylinders 3 will be noted as the left front wheel cylinder 3FL, the right front wheel cylinder 3FR, the left rear wheel cylinder 3RL, and the right rear wheel cylinder 3RR, in accordance with each wheel. The wheel cylinders 3 control the rotation of the wheels when fluid pressure is transmitted from the master cylinder 32 and a brake pad (not shown) provided to each wheel is operated.

The pump P is driven at a requested motor rotational speed based on a predetermined pressurization pressure and feeds brake fluid to the wheel cylinders 3 when the pressurization pressure is imparted to the wheel cylinders 3 to generate braking force. The brake fluid is fed from the master cylinder 32 described above. The brake fluid fed from the master cylinder 32 is pressurized by the master cylinder 32. This brake fluid is further pressurized by the pump P and fed to the wheel cylinders 3.

A circulation channel 63 functions as a channel for circulating a portion of the brake fluid fed to the wheel cylinders 3 to the pump P. In the present embodiment, the circulation channel 63 corresponds to the main channel 41 and the channel 51 described above. The brake fluid fed to the wheel cylinders 3 corresponds to the brake fluid discharged from the pump P, and is the brake fluid obtained by further pressurizing the brake fluid that has been pressurized by the master cylinder 32 as described above. The circulation channel 63 is disposed in parallel to the pump P so that the brake fluid can circulate from the downstream side of the pump P to the upstream side.

The pressure regulation valve 49 is disposed in the circulation channel 63 and the pressurization force to the wheel cylinders 3 is adjusted by controlling the valve position. The pressure regulation valve 49 according to the present embodiment is a normally-open-type valve that switches from an open state to a closed state in order to change the channel through which the brake fluid flows from open to blocked, and the valve element (not shown) of the pressure regulation valve 49 is opened and closed by energizing a linear solenoid (not shown) provided to the pressure regulation valve 49 with exciting current. The position of the pressure regulation valve 49 can be adjusted in accordance with the exciting current. The pressure regulation valve 49 is arranged in parallel with the pump P, as shown in FIG. 1. Therefore, the pressurization force delivered to the wheel cylinders 3 can be adjusted by opening and closing the pressure regulation valve 49. Adjustment of the pressurization force to such wheel cylinders 3 is carried out using pressurization control means 11 provided to the brake control apparatus 1.

A rotational speed sensor 61 detects the rotational speed of the motor M. The rotational speed sensor 61 is advantageously configured using a known Hall IC. The detection of the rotational speed by the Hall IC is known art and a description is therefore omitted. A master cylinder fluid pressure sensor 73 is disposed in the channel 33R and detects the pressure of the master cylinder 32. The detection results of the rotational speed sensor 61 and the master cylinder fluid pressure sensor 73 are transmitted to the brake control apparatus 1.

The brake control apparatus 1 controls the rotations of the pump P on the basis of the detection results transmitted from the amount-of-braking-operation detection sensor 22 in accordance with the brake operation by the driver, and adjusts the pressure fed to the wheel cylinders 3 by controlling the opening and closing of the pressure regulation valve 49. Therefore, the braking of the vehicle can be suitably controlled.

The brake control apparatus 1 according to the present embodiment is provided with a function that suitably compensates for pressure leakage from the pump P and feeds brake fluid with good pressure regulation precision. Improvement in the compensation and pressure regulation precision is brought about by correcting the rotation of the motor M using a adjusting motor rotational speed $X_n$. The computation of the adjusting motor rotational speed $X_n$ will now be described. In addition to the pressurization control means 11 described above, the brake control apparatus 1 is composed of the following functional units: storage means 12, adjusting motor rotational speed computation means 13, and requested motor rotational speed correction means 14.

The adjusting motor rotational speed computation means 13 causes the pressurization control means 11 to close the pressure regulation valve 49, causes the action that drives the pump P at a predetermined motor rotational speed to be carried out a plurality of times at different motor rotational speeds, and then computes in advance the adjusting motor rotational speed $X_n$ on the basis of the ratio between motor rotational speeds and the pressure gradients of when the pressurization force, which is obtained when the pump P has been driven at each motor rotational speed, has reached a predetermined pressure. In the present embodiment, the plurality of different motor rotational speeds will be described using two rotational speeds. The two rotational speeds are A (rpm) and B (rpm). In the present embodiment, the two rotational speeds and the pressurization force of when the pump P has been driven at the motor rotational speeds are used as measurement values. The adjusting motor rotational speed computation means 13 can specify the rotational speed on the basis of the detection results transmitted from the rotational speed sensor 61 described above.

The adjusting motor rotational speed $X_n$ is the rotational speed for correcting the requested motor rotational speed in the case that the pressurization control means 11 increases the pressure of the wheel cylinders 3 to generate braking force in the wheels. For example, the requested motor rotational speed is the motor rotational speed for generating the feed force computed in accordance with the brake operation of the driver and does not give consideration to the pressure that leaks from the pump P. The requested motor rotational speed naturally also includes the motor rotational speed computed in pump control during automatic pressurization such as traction control and lateral-skid suppression control. The adjusting motor rotational speed $X_n$ is the rotational speed that is not taken into account in the requested motor rotational speed and that is used for compensating for pressure that has leaked from the pump P.

The adjusting motor rotational speed computation means 13 first rotates the motor M at the rotational speed A (rpm). It is preferred that the adjusting motor rotational speed computation means 13 causes the pressurization control means 11 to close the pressure regulation valve 49 when the adjusting motor rotational speed $X_n$ is to be computed. As described above, the pressure regulation valve 49 is a normally-open-type valve and is therefore set in a closed state by energizing (switching on) the linear solenoid. This state is shown in the upper part of FIG. 2. Described below is the state in which the pressure regulation valve 49 is closed. When the motor M is to be rotated at a rotational speed A (rpm), the pump P is driven and the pressure on the downstream side of the pump P is increased. The pressure on the downstream side is the pressure on the feed channel 52 side.

Figure 2:
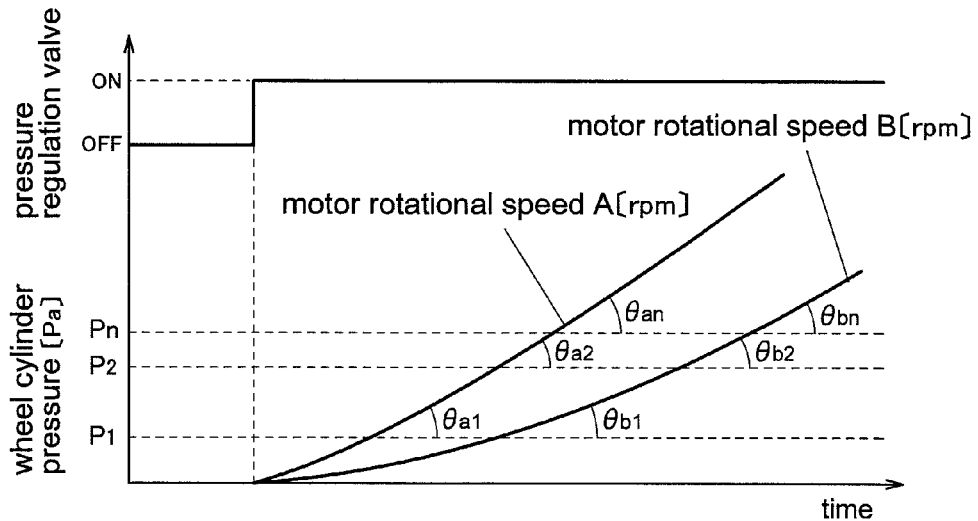
FIG. 2 is a diagram showing the computation of the adjusting motor rotational speed.
Figure 3:
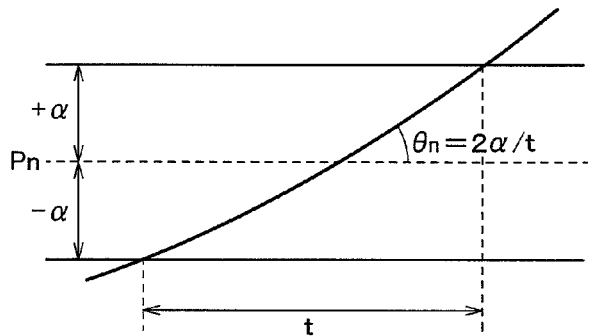
FIG. 3 is a diagram showing an example for calculating the gradient.

When the pump P is driven with the inlet valves 42 set in a communicative state (unenergized), the outlet valves 44 set in a blocked state (unenergized), and the pressure regulation valve 49 furthermore set in a blocked state (energized), the wheel cylinder pressure gradually increases. This temporal change is shown in the lower part of FIG. 2. The adjusting motor rotational speed computation means 13 drives the motor M at the rotational speed A (rpm) to compute the pressure gradient when the wheel cylinder pressure has reached a predetermined pressure (e.g., pressure P1, P2, ..., Pn) set in advance. The pressure gradient is the temporal change when a predetermined pressure has been reached. In the case that the pressure gradient at pressure Pn is to be computed, the computation can be carried out using the amount of change in the pressure for a predetermined time set in advance, as shown in FIG. 3, for example. In other words, the computation can be performed by dividing the pressure (e.g., 2α: the amount of change in pressure) separated a predetermined amount (+α/−α: plus or minus α) from the pressure Pn as a baseline by the time t (predetermined time set in advance) required for the pressure to change.

The adjusting motor rotational speed computation means 13 can thereby compute the pressure gradient at each predetermined pressure in the case that the motor M is driven at the rotational speed A (rpm). Such a pressure gradient is shown in FIG. 2 as θa1, θa2, ..., θan. The reference symbol θa1 is the pressure gradient at pressure P1, θa2 is the pressure gradient at pressure P2, and θan is the pressure gradient at pressure Pn.

Next, the adjusting motor rotational speed computation means 13 computes the pressure gradient for each predetermined pressure in the case that the motor M is driven at a rotational speed B (rpm). Such a pressure gradient is shown in FIG. 2 as θb1, θbn. The reference symbol θb1 is the pressure gradient at pressure P1, θb2 is the pressure gradient at pressure P2, and θbn is the pressure gradient at pressure Pn.

In this case, the adjusting motor rotational speed Xn required when pressure Pn is fed has a relationship such as that shown in Formula (1) below, wherein Pn is the pressure fed to the wheel cylinders 3 when braking force is corrected during ordinary driving (traveling state under driver control). Also, θan is the pressure gradient when the motor M has rotated and the wheel cylinder pressure has reached Pn at the rotational speed A (rpm), and θbn is the pressure gradient when the motor M has rotated and the wheel cylinder pressure has reached Pn at the rotational speed B (rpm)

[Formula 1]

$$\theta an/\theta bn=(A-Xn)/(B-Xn) \quad (1)$$

Formula (2) below is obtained by solving for the adjusting motor rotational speed Xn.

[Formula 2]

$$Xn=(A\times\theta bn-B\times\theta an)/(\theta an-\theta bn) \quad (2)$$

Figure 4:
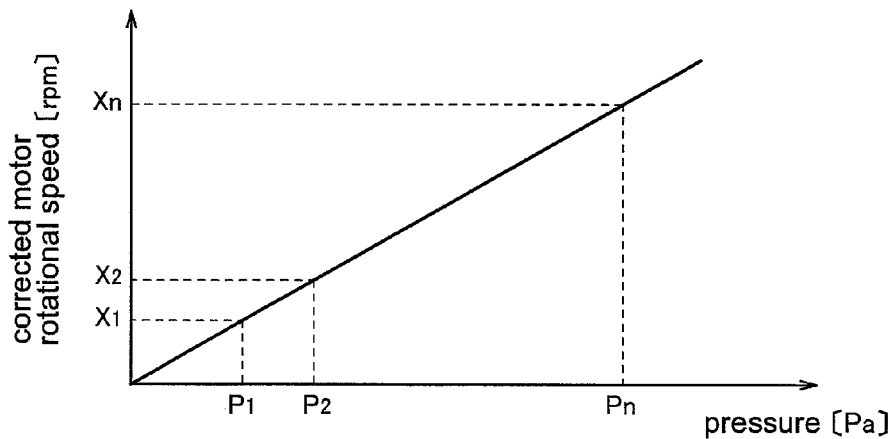
FIG. 4 is a diagram showing the mapped adjusting motor rotational speed.

The adjusting motor rotational speed computation means 13 computes the adjusting motor rotational speed Xn at each pressure using Formula (2). The relationship between the adjusting motor rotational speed Xn thus obtained and the pressure fed to the wheel cylinders 3 is mapped and stored in the storage means 12. An example of such a mapped relationship is shown in FIG. 4. The requested motor rotational speed correction means 14 described below suitably reads and uses the map shown in FIG. 4 from the storage means 12 when the braking force is corrected during ordinary driving. In other words, the adjusting motor rotational speed X1 is used when the current wheel cylinder pressure is P1, and the adjusting motor rotational speed X2 is used when the current wheel cylinder pressure is P2.

Here, according to the present brake control apparatus 1, the pressure to be fed to the wheel cylinders 3 is determined to be a target pressurization gradient θz that is required for bringing the current wheel cylinder pressure to the wheel cylinder pressure that corresponds to the brake operation. The rotational speed Z of the motor M required when the target pressurization gradient is θz and the current wheel cylinder pressure is Pn is shown in Formula (3) below.

[Formula 3]

$$Z=\theta z/\theta an\times(A-Xn)+Xn \quad (3)$$

The requested motor rotational speed correction means 14 corrects the requested motor rotational speed on the basis of the adjusting motor rotational speed, as shown in Formula (3), in the case that the pressurization control means 11 increases the pressure in the wheel cylinders 3 to generate braking force in the wheels. In other words, the requested motor rotational speed correction means 14 computes the target motor rotational speed by adding the requested motor rotational speed and the adjusting motor rotational speed. The leakage of hydraulic pressure from the pump P is therefore appropriately compensated for and the brake fluid having a pressure regulated with good precision can be fed to the wheel cylinder 3.

As described above, the brake control unit 40 shown in FIG. 1 is provided with a fluid pressure control unit 40F for [controlling] and imparting [the pressure of the brake fluid fed via the channel 33F] to the brake device BK of the left front FL and the brake device BK of the right front FR, and a fluid pressure control unit 40R for controlling and imparting the pressure of the brake fluid fed via the channel 33R to the brake device BK of the left rear RL and the brake device BK of the right rear RR. On the other hand, one pump P each is provided to the fluid pressure control unit 40F and the fluid pressure control unit 40R. In the case that the adjusting motor rotational speed Xn of the present invention is to be calculated, it is also possible to calculate the adjusting motor rotational speed Xn separately for the fluid pressure control unit 40F and the fluid pressure control unit 40R, and to calculate the adjusting motor rotational speed Xn by placing one of the plurality of inlet valves 42 in a communicative state and the other inlet valves 42 in blocked state. Also, in the Formula (3) noted above, the adjusting motor rotational speed Xn was computed using the rotational speed A (rpm) as a baseline, but it is also possible to compute the adjusting motor rotational speed Xn using the rotational speed B (rpm) as a baseline.

Figure 5:
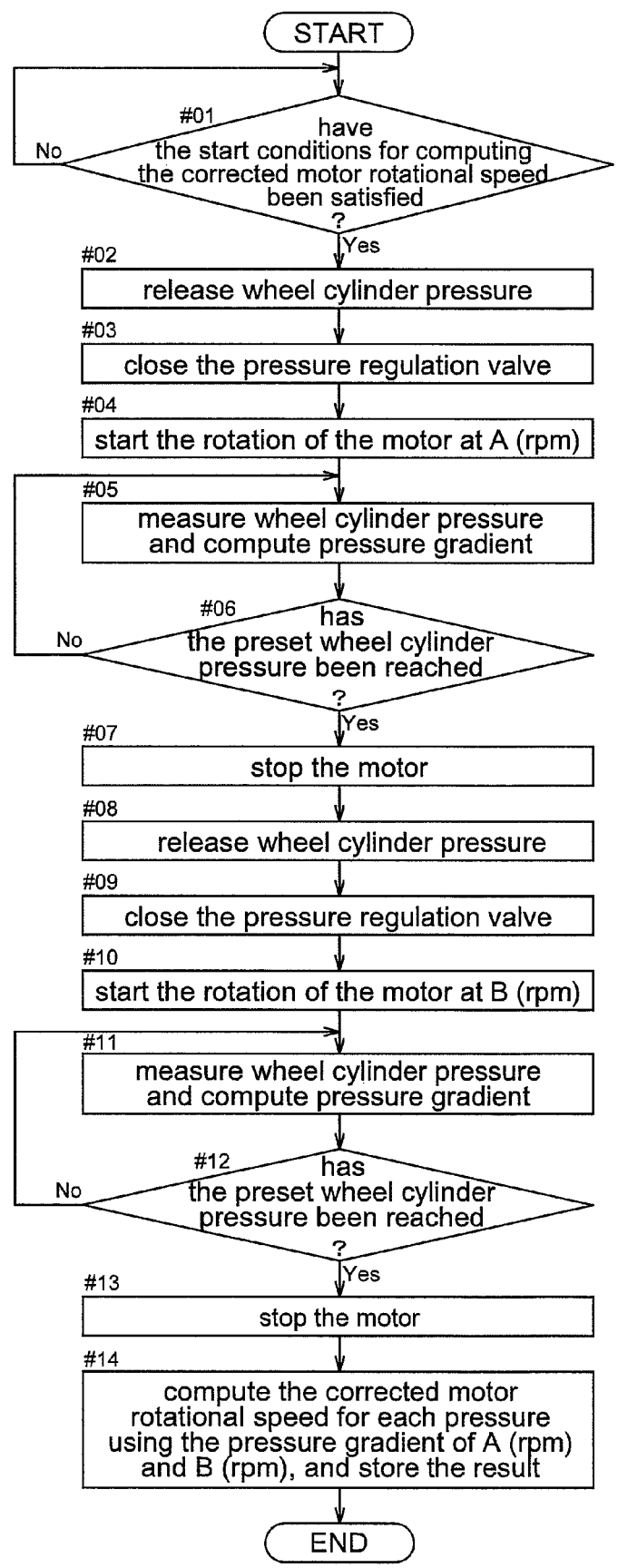
FIG. 5 is a flowchart showing the method for computing the adjusting motor rotational speed.

Next, the method by which the present brake control apparatus 1 computes the adjusting motor rotational speed Xn will be described with reference to the flowchart shown in FIG. 5. In the brake control apparatus 1, when the conditions for starting computation of the adjusting motor rotational speed Xn are satisfied (step #01: Yes), the pressurization control means 11 controls each valve of the brake control unit 40 so as to release the wheel cylinder pressure (step 402). Here, the conditions for starting computation are preferably conditions in which, e.g., "the brake pedal 30 is not depressed" and "the vehicle speed is 0." As shall be apparent, it is also possible to use other conditions. In the case that such conditions for starting computation are not satisfied (step #01: No), processing is not allowed to proceed.

When the wheel cylinder pressure has been released in step #02, the pressurization control means 11 sets the pressure regulation valve 49 in a closed state (step #03). The pressurization control means 11 controls the open/close state of the valves that are used for preventing the pressure of the brake fluid pressurized by the pump P from leaking to areas other than the wheel cylinders 3. In the brake control unit 40 of FIG. 1, the inlet valves 42 are set in a communicative state (unenergized) and the outlet valves 44 are set in a blocked state (unenergized). The brake fluid pressurized by the pump P is thereby fed only to the wheel cylinders 3.

Next, the adjusting motor rotational speed computation means 13 rotates the motor M at a predetermined rotational speed A (rpm) (step #04). Together with this rotation, the temporal change in the pressure in the wheel cylinders 3 is measured and the pressure gradient of each pressure is computed in accordance with the measurement results (step #05). The adjusting motor rotational speed computation means 13 continuously computes (step #05) the pressure gradient until (step #06: No) a preset wheel cylinder pressure is reached. When the preset wheel cylinder pressure is reached (step #06: Yes), the adjusting motor rotational speed computation means 13 stops driving the motor M (step #07) and the pressurization control means 11 controls the valves of the brake control unit 40 so that the wheel cylinder pressure is released (step #08).

Next, the pressurization control means 11 sets the pressure regulation valve 49 in a closed state (step #09). Also, the pressurization control means 11 controls the open/close state of the valves that are used for preventing the pressure of the brake fluid pressurized by the pump P from leaking to areas other than the wheel cylinders 3. In the brake control unit 40 of FIG. 1, the inlet valves 42 are set in a communicative state (unenergized) and the outlet valves 44 are set in a blocked state (unenergized). The brake fluid pressurized by the pump P is thereby fed only to the wheel cylinders 3.

The adjusting motor rotational speed computation means 13 rotates the motor M at a predetermined rotational speed B (rpm) (step #10). Together with this rotation, the temporal change in the pressure in the wheel cylinders 3 is measured and the pressure gradient of each pressure is computed in accordance with the measurement results (step #11). The adjusting motor rotational speed computation means 13 continuously computes (step #11) the pressure gradient until (step #12: No) a preset wheel cylinder pressure is reached. When the preset wheel cylinder pressure is reached (step #12: Yes), pressurization control means 11 computes the adjusting motor rotational speed Xn for each pressure using the pressure gradient obtained by computation when the motor M has been rotated at a rotational speed A (rpm) and the pressure gradient obtained by computation when the motor M has been rotated at a rotational speed B (rpm); and the storage means 12 stores the computed adjusting motor rotational speed Xn (step #14). The brake control apparatus 1 computes the adjusting motor rotational speed Xn in the manner described above.

Figure 6:
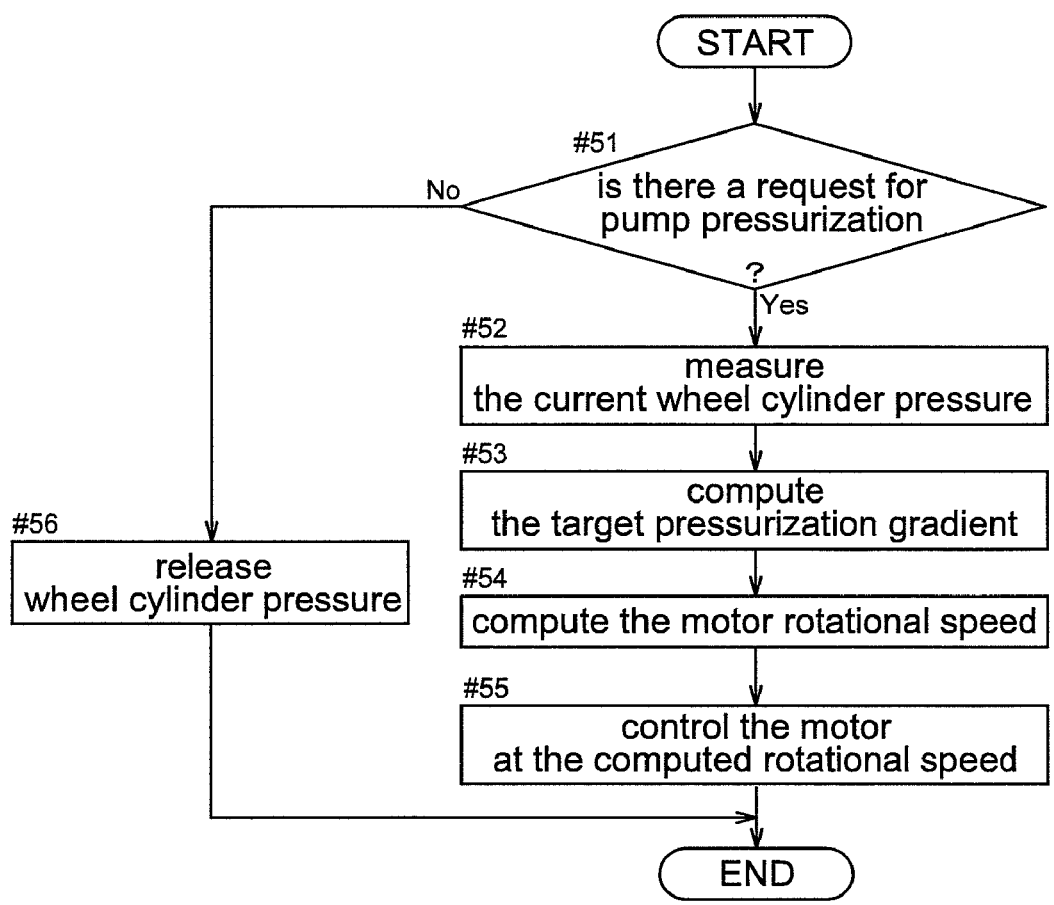
FIG. 6 is a flowchart showing the braking control carried out using the adjusting motor rotational speed.

Next, the processing carried out when the adjusting motor rotational speed Xn computed in the manner described above is used for brake control will be described with reference to the flowchart shown in FIG. 6. The requested motor rotational speed correction means 14 measures the current wheel cylinder pressure (step #52) when a pump pressurization request from the pressurization control means 11 has been detected (step #51: Yes). In the case that a pump pressurization request has not been detected (step #51: No), the wheel cylinder pressure is released (step #56) and processing is ended. In the case that a pump pressurization request has been detected, the requested motor rotational speed correction means 14 computes (step #53) the target pressurization gradient θz required for changing the current wheel cylinder pressure to a pressure that corresponds to the pedal operation amount.

The requested motor rotational speed correction means 14 computes the rotational speed Z of the motor M using the computed target pressurization gradient θz and adjusting motor rotational speed Xn that corresponds to the current wheel cylinder pressure (step #54). The requested motor rotational speed correction means 14 drives (step #55) the motor M at the rotational speed Z obtained by computation. In this manner, the brake control apparatus 1 can compensate for pump leakage and carry out braking control with good pressure regulation precision because the braking force is controlled using the adjusting motor rotational speed Xn.

The computation of the adjusting motor rotational speed Xn in the present invention may be configured to be carried out only when the brake control apparatus 1 is assembled in a vehicle in, e.g., the vehicle manufacturing plant, and the computation of the adjusting motor rotational speed Xn may be configured to be carried out for each preset pump usage time. The pump usage time corresponds to the utilization time of the pump P. In such a case, the adjusting motor rotational speed Xn can be computed each time the vehicle travels and a predetermined utilization time of the pump P has elapsed. In such a case, it is also possible to compensate for pump leakage brought about by age degradation.

Second Embodiment

Figure 7:
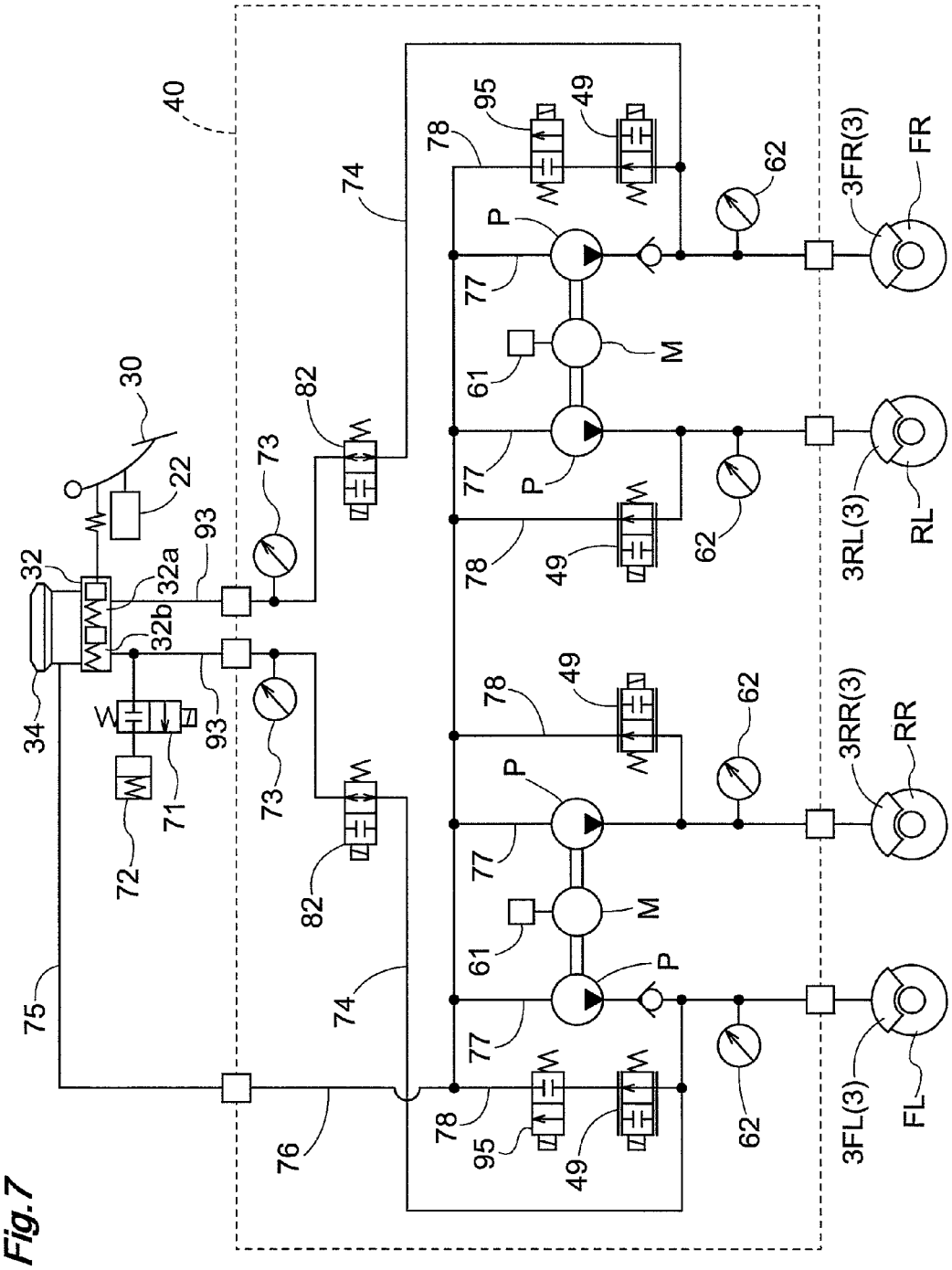
FIG. 7 is a view schematically showing the overall configuration of the brake control unit controlled by the brake control apparatus according to a second embodiment.

In the first embodiment, a configuration was described as an example in which the brake control unit 40 controlled by the brake control apparatus 1 has a pump P provided to each of the brake device BK of the front of the vehicle and the brake device BK of the rear of the vehicle. The brake control unit 40 controlled by the brake control apparatus 1 of the second embodiment is provided with a pump P to each of the wheel cylinders 3, as shown in FIG. 7. In such a brake control unit 40 as well, the brake control apparatus 1 of the present invention preferably compensates pump leakage by computing the adjusting motor rotational speed Xn of the motor M and driving the motor M on the basis of the adjusting motor rotational speed Xn thus computed, and is capable of carrying out brake control with good pressure precision.

The brake pedal 30, the amount-of-braking-operation detection sensor 22, the master cylinder 32, a stroke control valve 71, a stroke simulator 72, and the brake control unit 40 are shown in FIG. 7, and brake control apparatus 1 is the same as the first embodiment and is therefore omitted [from the drawing].

When the brake pedal 30 is depressed by the driver, the amount of brake operation of the brake pedal 30 is inputted to the amount-of-braking-operation detection sensor 22 and a detection signal that corresponds to the amount of operation is outputted from the amount-of-braking-operation detection sensor 22. The detection signal is inputted to the pressurization control means 11 (not shown) and the amount of brake operation is detected by the pressurization control means 11. A pedal force sensor, a stroke sensor, and the like can be used as the amount-of-braking-operation detection sensor 22. It is also possible to allow the state of operation of the brake pedal 30 by the driver to be detected based on the detection signal of the master cylinder fluid pressure sensor 73.

A channel 93 is provided for connecting the brake control unit 40 and each of the pressurization chambers 32a, 32b of the master cylinder 32. The master cylinder 32 is provided with a reservoir tank 34 for feeding brake fluid to the master cylinder 32 and storing excess brake fluid of the master cylinder 32. A direct channel 75 is arranged from the reservoir tank 34 to the brake control unit 40.

The stroke simulator 72 serves to accommodate the brake fluid inside the pressurization chamber 32b. The channel that connects the stroke simulator 72 and the pressurization chamber 32b is provided with a stroke control valve 71 configured from a normally-closed-type two-position valve for controlling the communicative/blocked state of the channel. The channel is configured so that the flow of brake fluid to the stroke simulator 72 can be controlled using the stroke control valve 71.

The brake control unit 40 is configured in the manner described below. A channel 74 connected to, the channel 93 is provided in order to connect the pressurization chamber 32a and the right front wheel cylinder 3FR. A normally-open-type control valve 82 is provided to the channel 74. The normally-open-type control valve 82 is a two-position valve that is in a communicative state when unenergized and in a blocked state when energized; and the communicative/blocked state of the channel 74 is controlled by the normally-open-type control valve 82.

The channel 74 connected to the channel 93 is provided in order to connect the pressurization chamber 32b and the left front wheel cylinder 3FL. A normally-open-type control valve 82 is provided to the channel 74. The normally-open-type control valve 82 is a two-position valve that is in a communicative state when unenergized and in a blocked state when energized; and the communicative/blocked state of the channel 74 is controlled by the normally-open-type control valve 82.

Also provided is a channel 76 connected to the channel 75, which extends from the reservoir tank 34. The channel 76 branches into a plurality of channels 77. The channels 77 are each connected to the wheel cylinder 3FR, the wheel cylinder 3RL, the wheel cylinder 3RR, and the wheel cylinder 3FL.

A pump P is provided to each of the channels 77. The pumps P for feeding brake fluid to the right front wheel cylinder 3FR and the left rear wheel cylinder 3RL are driven by one motor M, and the pumps P for feeding brake fluid to the right rear wheel cylinder 3RR and the left front wheel cylinder 3FL are driven by another motor M. Therefore, in the embodiment, the configuration has four pumps P and two motors M.

Circulation channels 78 are provided in parallel, one to each pump P. The circulation channel 78 circulates a portion of the brake fluid discharged from the pump P [back] to the pump P.

In particular, a pressure regulation valve 49 and a normally-closed-type control valve 95 are directly connected and provided to the circulation channel 78 for feeding brake fluid to the wheel cylinders 3FR, 3FL. The normally-closed-type control valve 95 is arranged on the intake port side (upstream side) of the pump P so that the pressure regulation valve 49 is positioned on the discharge port side (downstream side). The position of the pressure regulation valve 49 is modified in accordance with the applied current and controls the flow rate of circulation fluid in the same manner as the first embodiment described above. A pressure regulation valve 49 is also provided to the circulation channel 78 for feeding brake fluid to the wheel cylinders 3RL, 3RR.

Wheel pressure sensors 62 are provided between the pumps P of the channels 77 and the wheel cylinders 3FR to 3RR, and are thereby configured to be capable of detecting each wheel cylinder pressure. Also, a master cylinder fluid pressure sensor 73 is provided further upstream than the normally-open-type control valve 82 of the channel 74, and is thereby configured to be capable of detecting the fluid pressure of the master cylinder 32.

In the brake control unit 40 configured in this manner, the brake control apparatus 1 of the present invention computes the adjusting motor rotational speed $Xn$ and controls the braking force of the vehicle using the adjusting motor rotational speed $Xn$. In the case that the adjusting motor rotational speed $Xn$ is to be obtained, the adjusting motor rotational speed computation means 13 causes the pressurization control means 11 to set the pressure regulation valve 49 and the normally-open-type control valve 82 is in a blocked state, and causes the motor M to operate a plurality of times (e.g., two times) at different motor rotational speeds. The brake fluid pressurized by the pump P can therefore be fed to the wheel cylinders 3FL, 3RR, 3RL, 3RF. In such a state, the adjusting motor rotational speed computation means 13 measures the wheel cylinder pressure when the motor M has been driven at two rotational speeds, and the adjusting motor rotational speed $Xn$ is computed in the same manner as the first embodiment described above.

In the present embodiment, a single pump P is provided in correspondence with a single wheel cylinder 3. Therefore, the adjusting motor rotational speed $Xn$ may be obtained for each wheel cylinder 3, or the adjusting motor rotational speed $Xn$ may be obtained for each two wheel cylinders 3 connected to the pumps P driven by a single motor M. The computation of the adjusting motor rotational speed $Xn$ and the control of the braking force are the same as in the first embodiment described above, a description thereof is omitted.

Third Embodiment

In the description of the first embodiment above, the rotational speed $Z$ of the motor M required when the target pressurization gradient is $\theta z$ and the current wheel cylinder pressure $Pn$ was obtained from the Formula (3). However, the applicable range of the present invention is not limited thereby. As shall be apparent, it is also possible to compute the rotational speed $Z$ of the motor M as shown in Formula (4), wherein $V(cc)$ is the theoretical discharge volume of a single rotation of the pump P.

[Formula 4]

$$Z = \theta z / V + Xn \qquad (4)$$

Figure 8:
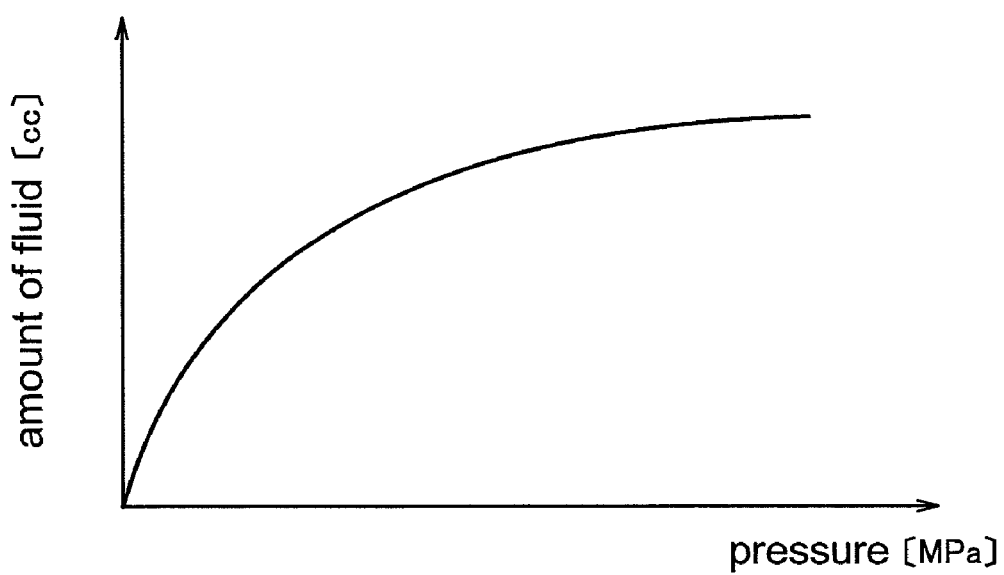
FIG. 8 is a view showing the relationship between the amount of fluid and pressure in the wheel cylinder according to a third embodiment.

In the case that the rotational speed $Z$ is to be computed using Formula (4), first, the target pressurization gradient $\theta z$, which is the first term on the right side of Formula (4), must be converted to a unit flow rate (the amount of fluid per minute). This conversion is carried out using the relationship between the pressure and amount of fluid in the wheel cylinder 3, as shown in FIG. 8. This relationship is preferably mapped and separately stared. When a target pressurization gradient $\theta z$ is requested, the adjusting motor rotational speed computation means 13 obtains the unit flow rate (amount of fluid) using the relationship between the pressure and the amount of fluid in the wheel cylinder 3, as shown in FIG. 8. The unit flow rate (amount of fluid) obtained in this manner is divided by the theoretical discharge volume $V(cc)$. The result is added to the adjusting motor rotational speed $Xn$ to thereby obtain the rotational speed $Z$ of the motor M.

Fourth Embodiment

In the description of the first to third embodiments above, the action of driving the pump P was carried out a plurality of times at different rotational speeds (motor rotational speeds), and the adjusting motor rotational speed $Xn$ was computed in advance based on the ratio between the rotational speed of each motor and each pressure gradient of when the pressurization force of the pump P driven at each motor rotational speed has reached a predetermined pressure. The fourth embodiment is different from the first to third embodiments described above in that the pressure gradient of when the pump P has been driven at a single motor rotational speed is stored in advance, and each time braking control is carried out, the adjusting motor rotational speed Xn is computed based on the stored pressure gradient.

Figure 9:
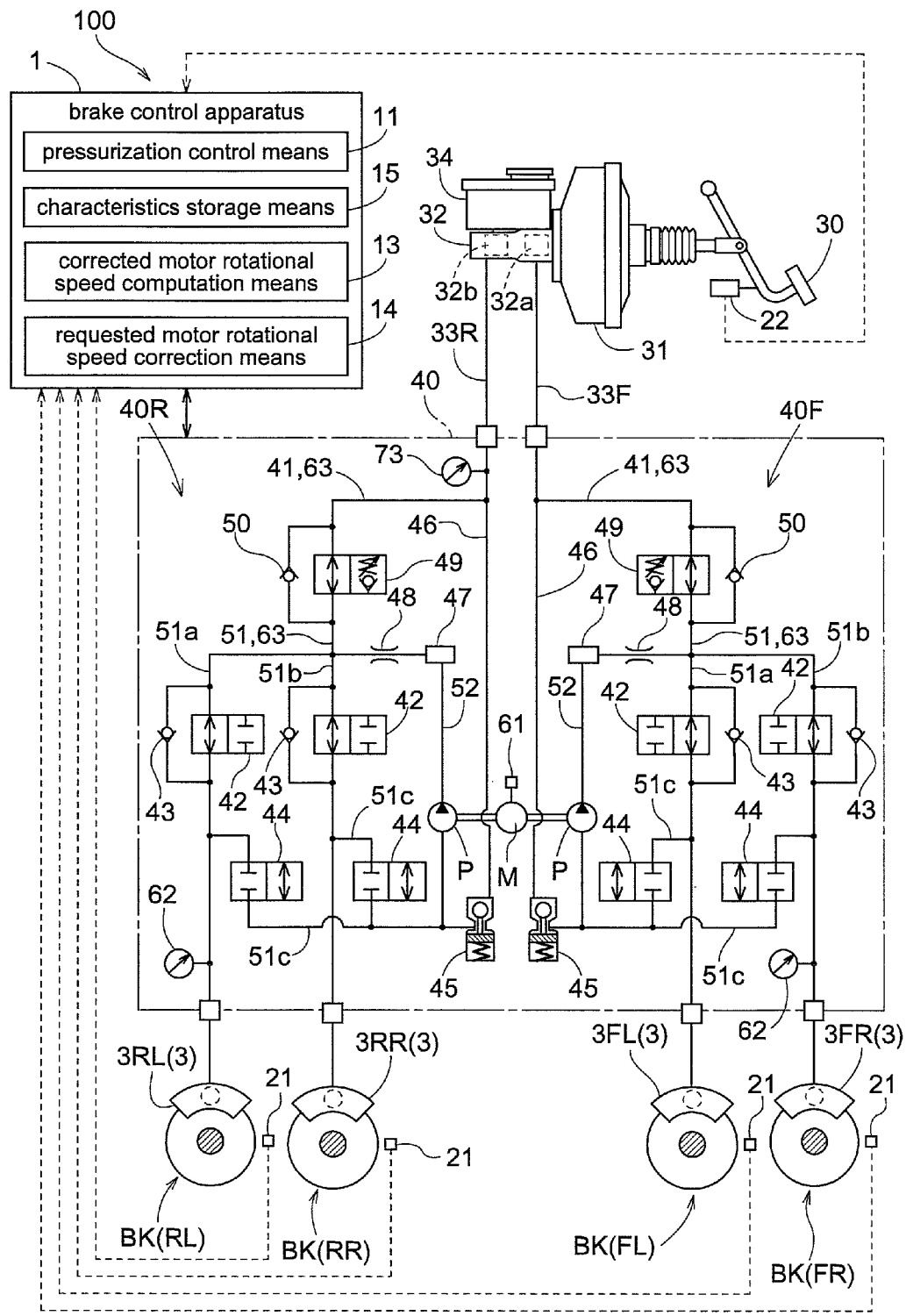
FIG. 9 is a block diagram schematically showing the overall configuration of the brake system according to a fourth embodiment.

FIG. 9 is a block diagram schematically showing the brake system 100 provided with the brake control apparatus of the present invention. The brake control apparatus 1 of the present embodiment is the same as the brake control apparatus 1 in the first to third embodiments described above in that pump P is driven at a requested motor rotational speed based on a pressurization force to feed brake fluid to the wheel cylinders 3, and pressurization control means 11 is provided for regulating the pressurization force by controlling the position of a pressure regulation valve 49 disposed in a circulation channel 63 for circulating a portion of the fed brake fluid [back] to the pump P, in the case that pressurization force is imparted to the wheel cylinders 3 disposed in each wheel of a vehicle to generate braking force in concert with the brake operation of the driver. On the other hand, the brake control apparatus 1 according to the present embodiment is different from the brake control apparatus 1 of the first embodiment in that characteristics storage means 15 is provided in place of the storage means 12. The differing points are mainly described below.

The characteristics storage means 15 stores in advance a temporal change of the wheel cylinder pressure in the case that the pressure regulation valve 49 has been set in a closed state and the pump P has been driven at a single motor rotational speed. A single rotational speed refers to a motor rotational speed unambiguously obtained in relation to a wheel cylinder pressure. In the description below, this single motor rotational speed is a single rotational speed A (rpm). The wheel cylinder pressure refers to the pressure of wheel cylinder 3. Also, in the present embodiment, a measurement value is used as the wheel cylinder pressure when the pump P has been driven at the rotational speed A (rpm). The measurement is carried out with the pressure regulation valve 49 in a closed state. The temporal change of the wheel cylinder pressure including pump leakage from the pump P can therefore be acquired. The wheel cylinder pressure is specified based on the detection results transmitted from the wheel pressure sensors 62. The motor rotational speed is specified based on the detection result transmitted from the rotational speed sensor 61.

The computation of the adjusting motor rotational speed Xn according to the present embodiment is carried out in the case that the brake system 100 is installed in the vehicle. First, the brake control apparatus 1 caused the motor M to rotate at the rotational speed A (rpm). The pressure regulation valve 49 is set in a closed state by the pressurization control means 11. The pressure regulation valve 49 is a normally-open-type valve and the linear solenoid is energized (an ON state) to set the valve in a closed state. This state is shown in the upper part of FIG. 10. When the motor M is caused to rotate at the rotational speed A (rpm) in this state, the pump P is driven and the pressure on the downstream side of the pump P is increased. The pressure on the downstream side is the pressure on the feed channel 52 side.

When the pump P is driven with the inlet valves 42 set in a communicative state (unenergized), the outlet valves 44 set in a blocked state (unenergized), and the pressure regulation valve 49 furthermore set in a blocked state (energized), the wheel cylinder pressure gradually increases. This temporal change is shown in the lower part of FIG. 10. The characteristics storage means 15 drives the motor M at the rotational speed A (rpm) to compute and store the pressure gradient (e.g., $\theta a1, \theta a2, \ldots, \theta an$) when the wheel cylinder pressure has reached a predetermined pressure (e.g., pressure P1, P2, ..., Pn) set in advance. The characteristics storage means 15 may map and store the pressure gradient such as that shown in FIG. 10 for each predetermined pressure, and may map and store the temporal change of the wheel cylinder pressure in the form of an approximation expression.

In the present embodiment, a single motor rotational speed is a single rotational speed A (rpm), but as described above, the single rotational speed may be a motor rotational speed unambiguously obtained in relation to a wheel cylinder pressure and is not limited to being a single [rotational speed] A (rpm).

For example, B (rpm) may be the interval in which the wheel cylinder pressure is 0 (Pa) or greater and less than Pth (Pa), C (rpm) may be Pth (Pa) or greater, and the motor M may be driven at maximum rotation to change the motor rotational speed for each wheel cylinder pressure. In other words, the method is not particularly limited as long as it is possible to store the relationship between the motor rotational speed, the wheel cylinder pressure, and the pressure gradient of the wheel cylinder pressure.

The adjusting motor rotational speed computation means 13 computes the adjusting motor rotational speed Xn for achieving a target pressurization gradient $\theta z$ on the basis of the temporal change in the stored wheel cylinder pressure in relation to the target pressurization gradient $\theta z$ of the pressurization force specified by brake operation and imparted to the wheel cylinders 3. Here, the amount of brake operation is detected by the amount-of-braking-operation detection sensor 22. The target pressurization gradient $\theta z$ is the pressure gradient required to bring the current wheel cylinder pressure to a pressurization force imparted to the wheel cylinders 3 that corresponds to the brake operation of the driver. For example, The target pressurization gradient $\theta z$ corresponds to the gradient specified by the reference symbol $\theta z$ in FIG. 10, wherein Pz is the current wheel cylinder pressure and P* is the pressurization force imparted to the wheel cylinders 3 in correspondence with the brake operation of the driver. Such a target pressurization gradient $\theta z$ is computed by the brake control apparatus 1 on the basis of the detection result detected by the amount-of-braking-operation detection sensor 22. Also, the target pressurization gradient $\theta z$ is computed each time there is a change in the wheel cylinder pressure.

The stored temporal change of the wheel cylinder pressure is the temporal change of the wheel cylinder pressure for when the motor M has rotated at the rotational speed A (rpm) stored in the characteristics storage means 15 as described above. Therefore, the adjusting motor rotational speed computation means 13 computes the adjusting motor rotational speed Xn on the basis of the temporal change of the wheel cylinder pressure when the motor M has been rotated at the rotational speed A (rpm) stored in the characteristics storage means 15. In other words, the adjusting motor rotational speed Xn is the rotational speed of the motor M required to bring the pressure gradient obtained when the motor M is driven at the rotational speed A (rpm) to the target pressurization gradient $\theta z$.

More specifically, within the temporal change of the wheel cylinder pressure, the adjusting motor rotational speed computation means 13 acquires the pressure gradient that corresponds to the wheel cylinder pressure at the point at which the brake is operated, and the adjusting motor rotational speed Xn is computed based on the acquired pressure gradient and the difference between the acquired pressure gradient and the target pressurization gradient θz. Further description is provided below with reference to the diagrams and formulae.

The brake control apparatus 1 acquires the wheel cylinder pressure for when the brake operation was carried out by the driver. This can be acquired from the output results of the wheel pressure sensors 62 described above. In other words, the acquired output results correspond to the current wheel cylinder pressure rather than the wheel cylinder pressure obtained by pressurization because a target pressurization gradient θz has been requested. In this case, Pz is the obtained current wheel cylinder pressure.

Figure 10:
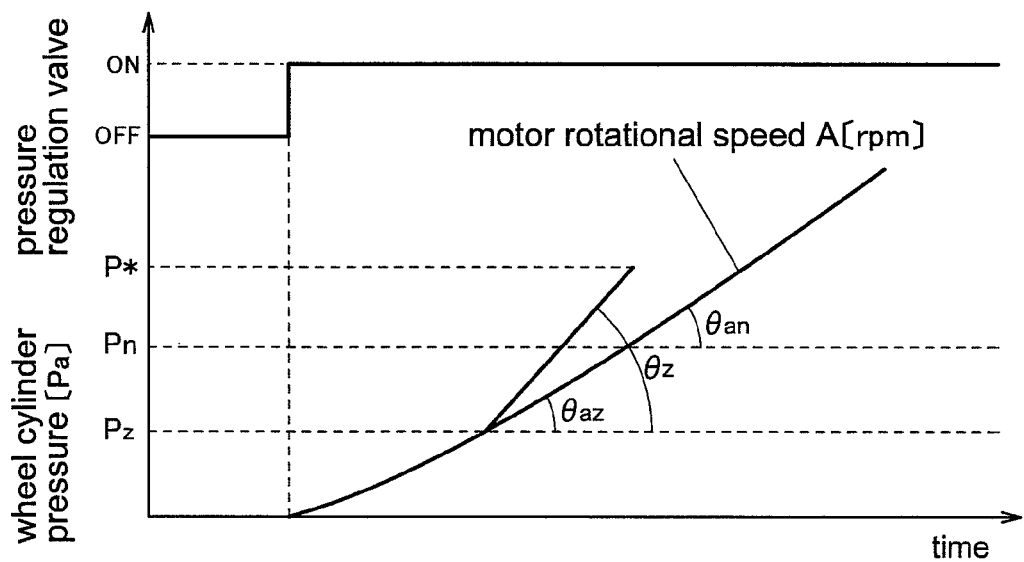
FIG. 10 is a view showing the temporal change of the wheel cylinder pressure according to the fourth embodiment.

The adjusting motor rotational speed computation means 13 acquires the pressure pressurization gradient θaz of the wheel cylinder pressure Pz from the wheel cylinder pressure temporal change stored in the characteristics storage means 15 (see FIG. 10). The pressure gradient θaz corresponds to the acquired pressure gradient described above.

Figure 11:
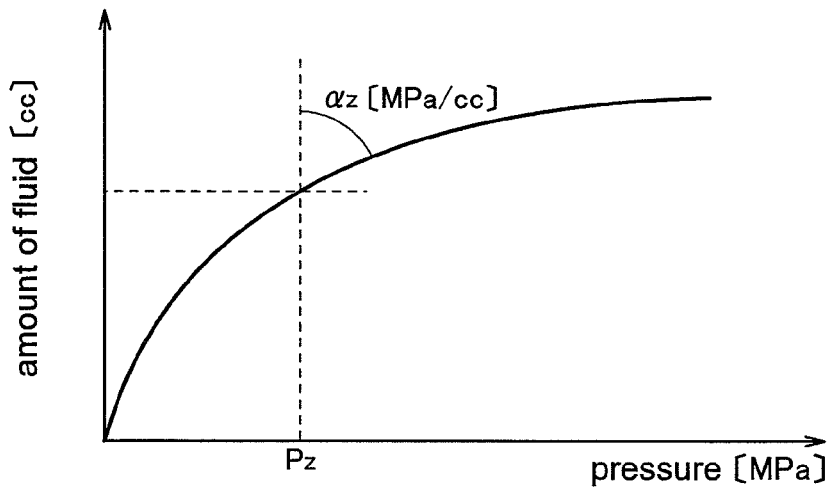
FIG. 11 is a view showing an example of the fluid amount/rigidity characteristic.

Next, the adjusting motor rotational speed computation means 13 acquires the pressure per unit flow rate (amount of fluid) of the pressure Pz from the fluid amount/rigidity characteristic of the wheel cylinders 3. The fluid amount/rigidity characteristic of the wheel cylinders 3 is an inherent characteristic of the wheel cylinders 3, and is a characteristic that shows the relationship between the wheel cylinder pressure and the amount of brake fluid. In other words, the fluid amount/rigidity characteristic is a characteristic that specifies the amount of brake fluid required when the wheel cylinder pressure is to be brought to a predetermined pressure. The fluid amount/rigidity characteristic of the wheel cylinders 3 is stored in a storage section (not shown) of the brake control apparatus 1. As shall be apparent, there is no limitation imposed by storage in a storage section, and it is also possible to use a configuration in which the characteristic is transmitted from outside the system as required. An example of the fluid amount/rigidity characteristic of the wheel cylinders 3 is shown in FIG. 11. As described above, the fluid amount/rigidity characteristic is a characteristic that shows the relationship between the wheel cylinder pressure and the amount of brake fluid. Therefore, the amount of brake fluid required when bringing the wheel cylinder pressure to a predetermined pressure can be specified. In the present embodiment, the amount of change in the wheel cylinder pressure per unit of fluid at a predetermined wheel cylinder pressure is specified using this characteristic. In the present embodiment, αz is the amount of change in the wheel cylinder pressure per unit of fluid at the pressure Pz.

The adjusting motor rotational speed computation means 13 computes the adjusting motor rotational speed Xn required for achieving a pressure gradient of the difference between the pressure gradient θaz at the wheel cylinder pressure Pz and the requested target pressurization gradient θz, on the basis of amount of change αz in the wheel cylinder pressure per unit of fluid described above and the theoretical discharge amount V of a single rotation of the pump P. This computation is carried out using Formula (5).

[Formula 5]

$$Xn = (\theta z - \theta az) \times 60 / (\alpha z \times V) \quad (5)$$

In the formula, the expression $(\theta z - \theta az)$ in the numerator is the pressure gradient, i.e., the pressure change per unit of time (1 second). The variable αz in the denominator is the amount of change in the wheel cylinder pressure per unit of fluid, and the variable V in the denominator is the amount of discharge per rotation of the pump P. Accordingly, [the expression $(\theta z - \theta az)$] is multiplied by 60 in order to obtain rotations per minute.

As described above, pump leakage is a pressure leak produced when the pump P is driven. The pump leakage does not depend on the rotational speed of the pump P, but rather depends on the differential pressure between the pressure on the upstream side and the pressure on the downstream side of the pump P. In the present embodiment, the rotational speed of the motor M required for achieving a pressure gradient at the current wheel cylinder pressure Pz is computed, and the amount of pump leakage is already included in the characteristics in which the pressure gradient at the rotational speed A (rpm) has been acquired. Therefore, the computation of the adjusting motor rotational speed Xn is carried out merely by computing the rotational speed for feeding a required amount of fluid to the wheel cylinders 3 in order to achieve a target pressurization gradient θz in relation to the pressure gradient θaz at the current wheel cylinder pressure Pz acquired from the temporal change of the wheel cylinder pressure using the rotational speed A (rpm), as shown in Formula (5) noted above.

The requested motor rotational speed correction means 14 corrects the requested motor rotational speed on the basis of the adjusting motor rotational speed Xn obtained in this manner. In other words, the requested motor rotational speed correction means 14 computes the rotational speed Z of the motor M in which consideration has been given to pump leakage, as shown in Formula (6), from the adjusting motor rotational speed Xn and the rotational speed A (rpm) of the motor M of when the temporal change of the wheel cylinder pressure stored in the characteristics storage means 15 is acquired.

[Formula 6]

$$Z = A + Xn \quad (6)$$

Thus, in accordance with the aspect of the present embodiment, the rotational speed A (rpm) of the motor M for when the temporal change of the wheel cylinder pressure is acquired already includes pump leakage in the current wheel cylinder pressure Pz, and merely added is the rotational speed for feeding the amount of fluid required to bring the pressure gradient θaz at the current wheel cylinder pressure to a target pressurization gradient θz. In other words, the amount of fluid to be added does not require consideration be given to pump leakage at the same pressure, and the pressure gradient of the pressure at that point in time can be reacquired and the adjusting motor rotational speed Xn can be computed using Formula (5) described above when the wheel cylinder pressure Pz has been changed in response to feeding brake fluid to the wheel cylinders 3. Thus, it is possible to obtain a desired rotational speed Z of the motor M in which consideration has been given to pump leakage by adding the adjusting motor rotational speed Xn and the rotational speed A (rpm) of the motor M of when the temporal change of the wheel cylinder pressure is acquired. The leakage of hydraulic pressure from the pump P can therefore be suitably compensated and brake fluid can be fed to the wheel cylinders 3 at a pressure that is regulated with good precision.

Other Embodiments

In the embodiments described above, two rotational speeds and the pressure fed to the wheel cylinders 3 were described as measured values. However, the applicable range of the present invention is not limited thereby. As shall be apparent, one among the pressure fed to the wheel cylinders 3 and the two rotational speeds may be a design value of the pump P. The adjusting motor rotational speed Xn of the present invention can be suitably computed even when a design value of the pump P is used (in other words, the adjusting motor rotational speed Xn can be obtained from the difference between the design value and the measured value). It is also possible to use values in the specification table of the pump P as the design value of the pump P.

In the embodiments described above, the adjusting motor rotational speed Xn was described as being calculated using two rotational speeds of the motor. However, the applicable range of the present invention is not limited thereby. It is, of course, also possible to compute the adjusting motor rotational speed Xn using three or more rotational speeds.

In the description of the embodiments above, the pressure of the brake fluid is fed to the brake device BK of the left front FL and to the brake device BK of the right front FR via the channel 33F, and the pressure of the brake fluid is fed to the brake device BK of the left rear RL and to the brake device BK of the right rear RR via the channel 33R. However, the applicable range of the present invention is not limited thereby. The present invention can, as shall be apparent, also be applied when the pressure of the brake fluid is fed to the brake device BK of the right front FR and to the brake device BK of the left rear RL via the channel 33F, and the pressure of the brake fluid is fed to the brake device BK of the left front FL and to the brake device BK of the right rear RR via the channel 33R.

In the fourth embodiment, an example was described in which the brake control apparatus 1 was applied to the brake system 100 shown in FIG. 9. However, the applicable range of the present invention is not limited thereby. It is also possible to, e.g., compute the adjusting motor rotational speed Xn of the motor M and to drive the motor M at a rotational speed corrected using the adjusting motor rotational speed Xn thus computed, even when a brake control unit 40 in which a pump F is provided to each wheel cylinder 3, as shown in FIG. 7. In this case as well, pump leakage can be advantageously compensated for and braking control can be carried out with good pressure regulation precision.

The present invention can be used as a brake control apparatus for controlling the braking force of a vehicle.

What is claimed is:

1. A brake control apparatus provided with pressurization control means whereby, in a case where a pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated;
the brake control apparatus comprising:
characteristics storage means for storing in advance a temporal change of the wheel cylinder pressure in a case that the pressure regulation valve has been set in a closed state and the pump has been driven at an unambiguous motor rotational speed in relation to the wheel cylinder pressure; and
adjusting motor rotational speed computation means for computing, in relation to a target pressurization gradient of the pressurization force imparted to the wheel cylinder, a adjusting motor rotational speed for yielding the target pressurization gradient on the basis of the temporal change of the stored wheel cylinder pressure.

2. The brake control apparatus of claim 1, wherein the adjusting motor rotational speed computation means acquires the pressure gradient that corresponds to the wheel cylinder pressure at the point in the temporal change of the wheel cylinder pressure at which the pressurization force is imparted and brake force is generated, and computes the adjusting motor rotational speed on the basis of the acquired pressure gradient and the difference between the acquired pressure gradient and the target pressurization gradient.

3. A brake control apparatus provided with pressurization control means whereby, in a case where a predetermined pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated, the brake control apparatus comprising:
adjusting motor rotational speed computation means for causing the pressurization control means to set the pressure regulation valve in a closed state and carry out an action of driving the pump at a predetermined motor rotational speed a plurality of times at different motor rotational speeds, and for computing in advance a adjusting motor rotational speed on the basis of the ratio between each of the motor rotational speeds and each of the pressure gradients for when the pressurization force of a pump driven at each of the motor rotational speeds has reached a predetermined pressure; and
requested motor rotational speed correction means for correcting the requested motor rotational speed on the basis of the adjusting motor rotational speed in a case where the pressurization control means increases the pressure of the wheel cylinders and generates braking force in the wheels.

4. The brake control apparatus of claim 3, wherein the requested motor rotational speed correction means adds the requested motor rotational speed and the adjusting motor rotational speed to compute the target motor rotational speed.

5. The brake control apparatus of claim 4, further comprising storage means for mapping and storing the relationship between the adjusting motor rotational speed and the pressure fed to the wheel cylinders.

6. The brake control apparatus of claim 4, wherein the computation of the adjusting motor rotational speed is carried out every preset time of pump usage.

7. The brake control apparatus of claim 3, further comprising storage means for mapping and storing the relationship between the adjusting motor rotational speed and the pressure fed to the wheel cylinders.

8. The brake control apparatus of claim 7, wherein the computation of the adjusting motor rotational speed is carried out every preset time of pump usage.

9. The brake control apparatus of claim 7, wherein the computation of the pressure gradient is carried out using the amount of change in pressure in a predetermined time set in advance.

10. The brake control apparatus of claim 3, wherein the computation of the adjusting motor rotational speed is carried out every preset time of pump usage.

11. The brake control apparatus of claim 10, wherein the computation of the pressure gradient is carried out using the amount of change in pressure in a predetermined time set in advance.

12. The brake control apparatus of claim 3, wherein the computation of the pressure gradient is carried out using the amount of change in pressure in a predetermined time set in advance.

13. A method for computing motor rotational speed in a brake control apparatus provided with pressurization control means whereby, in a case where a predetermined pressurization force is applied to a wheel cylinder disposed in individual wheels of a vehicle and a braking force is generated, a pump is driven at a requested motor rotational speed based on the pressurization force so that brake fluid is fed to the wheel cylinder; and the position of a pressure regulation valve disposed in a circulation channel for circulating a portion of the fed brake fluid to the pump is controlled and the pressurization force is regulated; the method comprising:

causing the pressurization control means to set the pressure regulation valve in a closed state and carry out an action of driving the pump at a predetermined motor rotational speed a plurality of times at different motor rotational speeds, and for computing in advance a adjusting motor rotational speed on the basis of the ratio between each of the motor rotational speeds and each of the pressure gradients for when the pressurization force of a pump driven at each of the motor rotational speeds has reached a predetermined pressure; and computing the requested motor rotational speed on the basis of the adjusting motor rotational speed in a case where the pressurization control means increases the pressure of the wheel cylinders and generates braking force in the wheels.

\* \* \* \* \*